Nov. 25, 1958 E. W. ANTHON 2,861,459
ELECTROMAGNETICALLY CONTROLLED FRICTION TRANSMISSION
Filed Oct. 15, 1956 2 Sheets-Sheet 1

INVENTOR.
ERIK W. ANTHON
BY
Lippincott & Smith
ATTORNEYS

Nov. 25, 1958 E. W. ANTHON 2,861,459
ELECTROMAGNETICALLY CONTROLLED FRICTION TRANSMISSION
Filed Oct. 15, 1956 2 Sheets-Sheet 2
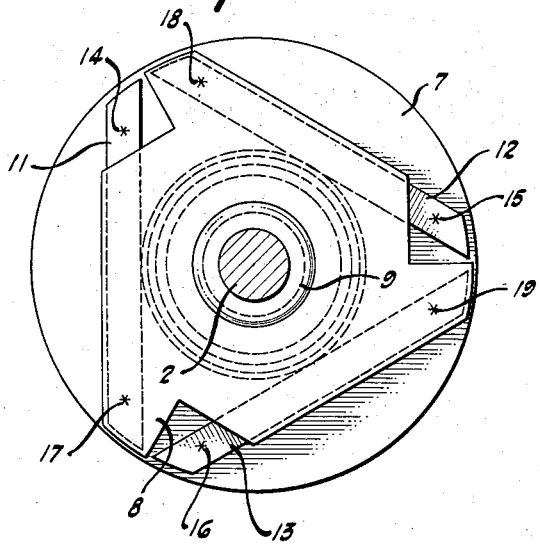
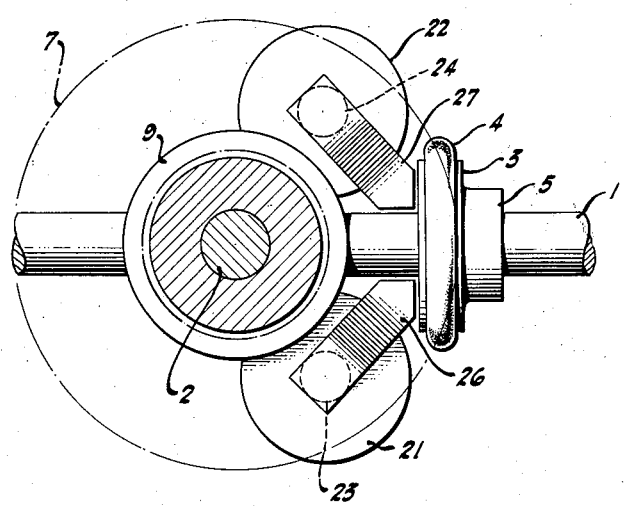
INVENTOR.
ERIK W. ANTHON
BY
ATTORNEYS

United States Patent Office 2,861,459
Patented Nov. 25, 1958

2,861,459

ELECTROMAGNETICALLY CONTROLLED FRICTION TRANSMISSION

Erik W. Anthon, El Cerrito, Calif., assignor to Beckman Instruments, Inc., Fullerton, Calif., a corporation of California Application October 15, 1956, Serial No. 616,090

1 Claim. (Cl. 74—210)

This invention relates to friction clutches, and in particular to an improved electrically controlled clutch suitable for use in instrument-type servomechanisms and the like.

In servo systems there is a frequent need for small, inexpensive clutches. For example, in many analog electronic computers there is a need for small clutches that can connect one servomotor to a number of variable components, such as potentiometers, one at a time. Since servomotors are somewhat expensive and bulky, and since one computer may contain a great many variable components that are to be driven or adjusted by a servomotor, it is often desirable to have one servomotor that can drive or adjust any selected one or ones of as many as one hundred potentiometers and the like.

It is evident that such a servo system requires a large number of small, inexpensive clutches. In addition to small size and low cost, the clutches must meet other requirements including the following: when engaged, the clutch must transmit a torque high enough to drive the shaft of a potentiometer or other variable component, but low enough to protect the system components from damage in the event of over-driving or overload; when disengaged, the clutch must not transmit any torque to the driven shaft, so that there will be no drag that might change the setting of components previously adjusted; when the driving shaft is stationary, engaging and disengaging of the clutch must not transmit any rotary motion to the driven shaft; backlash must be substantially eliminated; the alinement of the clutch and drive shaft should not be too critical; electromagnetic control with low power consumption should be provided; and the clutch must operate very reliably.

Heretofore no available clutches have met all of the aforesaid requirements and still been sufficiently low in cost. Accordingly, an object of this invention is to provide an improved, small, low-cost clutch that is ideally suited to the uses under consideration.

Briefly stated, in accordance with certain aspects of this invention whereby the foregoing and other objects and advantages are achieved, an improved clutch consists essentially of a wheel mounted on a first shaft and a flat disc resiliently mounted on a second shaft perpendicular to the first. The disc is axially movable and capable of tilting to a small extent, so that it can be brought into frictional engagement with the wheel; whereupon the two shafts are frictionally coupled together so that rotation of one rotates the other.

The mounting for the aforesaid flat disc includes another disc that is rigidly attached to the second shaft. The two discs are substantially parallel and axially alined. They are connected together by a plurality of leaf springs disposed perpendicular to diameters of the discs and having their opposite ends welded to respective ones of the two discs. The springs tend to pull the two discs together, so that the axially movable disc normally rests against an annular spacer between the discs and is thus held in a plane normal to the second shaft. This is the disengaged position of the clutch. For engaging the clutch, there is provided an electromagnet having a novel pole structure hereinafter described. The axially movable disc is of ferromagnetic material. When the magnet is energized, the axially movable disc is pulled slightly away from the annular spacer by magnetic attraction into frictional engagement with the wheel mounted on the other shaft.

The invention will be better understood from the following detailed description of an illustrative embodiment taken in connection with the accompanying drawings, and its scope is pointed out in the appended claim. In the drawings:

Fig. 3 is a view taken generally along the line 3—3 of Fig. 1; and

Fig. 4 is a section taken generally along the line 4—4 of Fig. 1.

Figure 1:
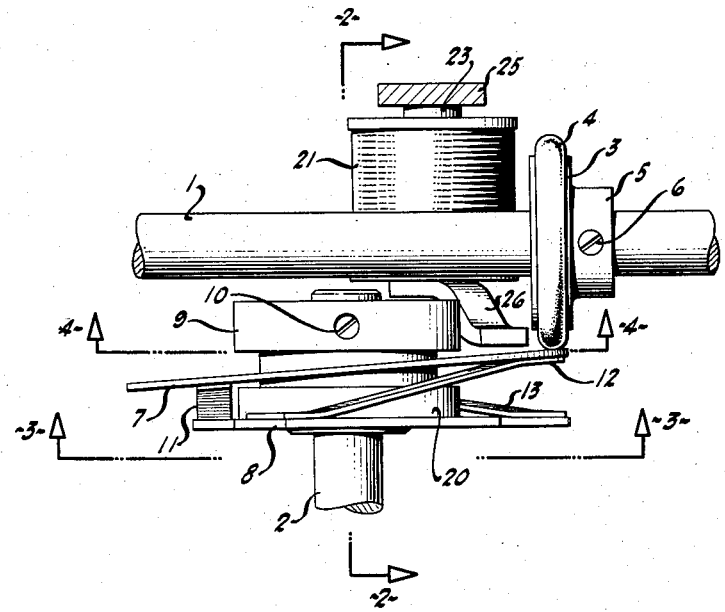
Fig. 1 is a side elevation of the improved clutch, with a portion of the electromagnet structure cut away.

Referring to the drawings, a driving shaft 1 and a driven shaft 2 are disposed substantially perpendicular to each other, as shown. In a servo system of an analog computer, for example, shaft 1 may be connected to a servomotor and shaft 2 may be connected to a potentiometer or to any other device that is to be adjusted at certain times by the servomotor. Each shaft is supported for rotation about its axis by conventional bearings or the like (not shown).

A wheel 3 is mounted on shaft 1 and rotates therewith. Preferably, wheel 3 is provided with a tire 4 of rubber or of other appropriate material having good non-skid characteristics. Wheel 3 is held in fixed position on shaft 1 by suitable means such as hub 5 and one or more set screws 6. Many similar wheels can be positioned along the length of the same driving shaft 1 to provide additional clutches for selectively engaging a number of driven shafts.

A flat disc 7, usually punched from sheet steel or the like, is mounted on shaft 2 in such a way that disc 7 can move into contact with tire 4 for engaging the clutch or can move out of contact with tire 4 for disengaging the clutch. If desired, the upper surface of disc 7 can be roughened (as by sand blasting) to provide a high-friction contact between tire 4 and disc 7 when the clutch is engaged. The mounting for disc 7 includes another disc 8, preferably having a somewhat triangular shape as is best shown in Fig. 3, rigidly attached to and axially alined with shaft 2 by means of a hub 9 and one or more set screws 10. Discs 7 and 8 are substantially parallel and axially alined with each other and are substantially normal to the axis of shaft 2, as shown.

Figure 2:
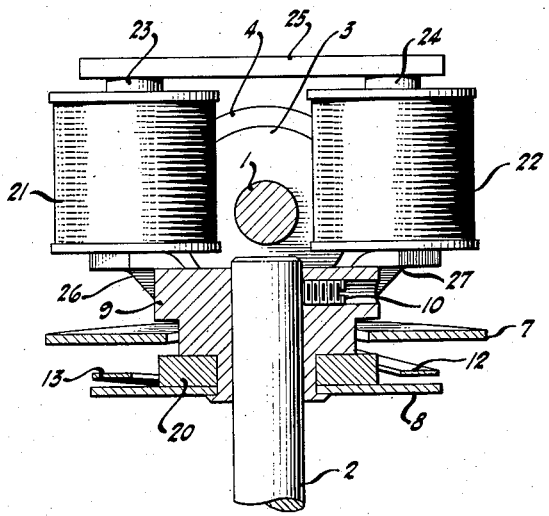
Fig. 2 is a section taken generally along the line 2—2 of Fig. 1.

Three leaf springs 11, 12 and 13 are arranged substantially in the form of an equilateral triangle, as shown in Fig. 3, with each spring extending perpendicular to a diameter of disc 7. One end of each spring is spot welded to disc 7, as is indicated in Fig. 3 by *'s at 14, 15 and 16, and the other end at each spring is spot welded to disc 8, as is indicated by *'s at 17, 18 and 19. The three springs tend to pull the two discs 7 and 8 together, so that disc 7 rests against an annular spacer 20 when the clutch is disengaged. Spacer 20 is in a flat metal ring attached to hub 9 and positioned in axial alinement between the two discs 7 and 8, as is best shown in Fig. 2. This arrangement holds disc 7 normal to the axis of shaft 2 when the clutch is disengaged, and it insures against any inadvertent drag at undesired times between tire 4 and disc 7.

Engagement of the clutch is effected by an electromagnet that is operable to draw disc 7 into contact with tire 4. Accordingly, disc 7 is made of a ferromagnetic material such as iron or steel. The electromagnet comprises two coils 21 and 22 wound upon two parallel iron cores 23 and 24. The tops of the two cores are connected by an iron bar 25, which may be part of a supporting structure for the electromagnet, to form an inverted "U-shaped" electromagnet having opposite magnetic poles at the lower ends of cores 23 and 24. That is, whenever coils 21 and 22 are energized with direct current, the lower end of one core becomes a north magnetic pole while the lower end of the other core becomes a south magnetic pole. In practice, either direct current or alternating current energization may be employed. The electromagnet is held in fixed position by any convenient supporting structure.

Two iron pole pieces 26 and 27 are attached to the lower ends of magnet cores 23 and 24. If desired, each pole piece and the magnet core to which it is attached may be made from a single piece of metal. The two pole pieces extend obliquely inward and downward, as shown, to form a magnet gap just above disc 7 and close to one side of wheel 3. When the electromagnet is energized, magnetic flux flows between the two pole pieces and through a portion of disc 7, and this portion of disc 7 is attracted toward the magnet gap. Thus the magnetic attraction slightly tilts disc 7 to the position shown in Fig. 1, so that a peripheral portion of disc 7 is brought into firm contact and frictional engagement with rubber tire 4. As soon as the electromagnet is de-energized, springs 11, 12 and 13 quickly return disc 7 to its disengaged position out of contact with tire 4.

The clutch described operates very quickly, since only a slight motion of the small disc 7 is required to engage or to disengage the clutch. Since the leaf springs exert but little force against small axial and tilting movements of disc 7, only a small amount of electric power is required to engage the clutch. On the other hand, rotational forces transmitted from disc 7 to disc 8 and thence through hub 9 to shaft 2 produce substantially lengthwise forces in springs 11, 12 and 13, so that considerable torque can be transmitted without danger of damaging the springs.

In fact, the maximum torque is limited by the friction between tire 4 and disc 7. For transmitting relatively large amounts of torque, disc 7 may be made of relatively large diameter, its surface may be roughened to provide a high coefficient of friction with tire 4, and the attraction of the electromagnet may be made relatively large to produce a higher contact force between disc 7 and tire 4. For transmitting smaller amounts of torque, any or all of the aforesaid parameters can be reduced. Consequently various maximum torque ratings can be achieved by simple changes in the clutch design, or even by mere changes in the energizing current of the electromagnet. Thus the clutch can be designed to provide adequate but not excessive torque for various uses and applications, without restricting the power of the servomotor. If desired, the servomotor may be made sufficiently powerful to drive any selected number of driven shafts simultaneously.

It should be noted that the clutch herein described has substantially no backlash, since springs 11 through 13 prevent any substantial relative angular motion between discs 7 and 8. There is never any coupling or drag between the driving and driven shafts when the clutch is disengaged. Nor is there any rotary motion of the driven shaft when the clutch is engaged or disengaged while the driving shaft is stationary. The dimensions and alinement of the parts are not overly critical, and high-precision manufacturing techniques are not required. This, in combination with the simplicity of the construction, results in low cost and high reliability. Furthermore, the compact size of the clutch, and the fact that a large number of clutches may share a common driving shaft 1, facilitates the use of large numbers of the improved clutches in applications such as computer servomechanisms.

It should be understood that this invention in its broader aspects is not limited to the specific embodiment herein illustrated and described, and that the following claim is intended to cover all changes and modifications that do not depart from the true spirit and scope of the invention.

What is claimed is:

A clutch comprising first and second rotative shafts disposed substantially perpendicular to each other, a wheel mounted in fixed position upon and rotative with said first shaft, a first disc mounted in fixed position upon, substantially normal to and rotative with said second shaft, a second disc substantially parallel and axially alined with said first disc, said second disc being of ferromagnetic material and lying between said first disc and the periphery of said wheel, a plurality of leaf springs disposed between said first and second discs and extending substantially perpendicular to diameters of the discs, each of said springs having opposite ends affixed to respective ones of said discs, whereby said second disc is resiliently mounted for axial and tilting motion but not for substantial rotative motion relative to said first disc, said springs pulling said two discs together and holding said second disc normally out of contact with said wheel, and an electromagnet having a magnet gap adjacent to said second disc and said wheel so that magnetic attraction provided when said electromagnet is energized draws said second disc into contact with the periphery of said wheel, said electromagnet being substantially U-shaped and having attached thereto two pole pieces extending obliquely inward toward each other, forming a magnet gap disposed adjacent to said second disc and close to one side of said wheel.

References Cited in the file of this patent

UNITED STATES PATENTS

| | | |
|---|---|---|
| 1,296,604 | Adams | Mar. 11, 1919 |
| 2,463,513 | Brubaker | Mar. 8, 1949 |
| 2,739,683 | Gamundi | Mar. 27, 1956 |